(12) United States Patent
Karino

(10) Patent No.: US 9,215,738 B2
(45) Date of Patent: Dec. 15, 2015

(54) NETWORK COMMUNICATION SYSTEM AND TERMINAL

(75) Inventor: Shuichi Karino, Tokyo (JP)

(73) Assignee: NEC Corporation, Tokyo (JP)

( * ) Notice: Subject to any disclaimer, the term of this patent is extended or adjusted under 35 U.S.C. 154(b) by 106 days.

(21) Appl. No.: 14/116,337

(22) PCT Filed: May 16, 2012

(86) PCT No.: PCT/JP2012/003216
§ 371 (c)(1),
(2), (4) Date: Nov. 7, 2013

(87) PCT Pub. No.: WO2012/157275
PCT Pub. Date: Nov. 22, 2012

(65) Prior Publication Data
US 2014/0071975 A1 Mar. 13, 2014

(30) Foreign Application Priority Data

May 17, 2011 (JP) ................. 2011-110750

(51) Int. Cl.
*H04J 3/16* (2006.01)
*H04W 4/00* (2009.01)
*H04W 76/02* (2009.01)
(Continued)

(52) U.S. Cl.
CPC ............ *H04W 76/021* (2013.01); *H04W 4/001* (2013.01); *H04W 48/16* (2013.01); *H04W 60/00* (2013.01); *H04W 76/02* (2013.01); *H04W 84/12* (2013.01)

(58) Field of Classification Search
None
See application file for complete search history.

(56) References Cited

U.S. PATENT DOCUMENTS

| 7,477,632 B1 * | 1/2009 | Radhakrishnan et al. ..... 370/338 |
| 8,340,065 B2 * | 12/2012 | Gupta et al. .................. 370/338 |
| 2005/0135375 A1 | 6/2005 | Hurtta et al. |

(Continued)

FOREIGN PATENT DOCUMENTS

| WO | WO 2005/064956 | 7/2005 |
| WO | WO 2005/086380 | 9/2005 |
| WO | WO 2007/048318 A1 | 5/2007 |

OTHER PUBLICATIONS

International Search Report in PCT/JP2012/003216 dated Aug. 14, 2012 (English Translation Thereof).

(Continued)

*Primary Examiner* — Redentor Pasia
(74) *Attorney, Agent, or Firm* — McGinn IP Law Group, PLLC

(57) ABSTRACT

A network communication system has: a terminal performing communication through a wireless LAN; and a controller. The terminal retains flow SSID information indicating a correspondence relationship between each flow and SSID. When initiating communication of a new flow, the terminal transmits an allocation request to the controller. The allocation request requests for determination of an SSID to be used. In response to the allocation request, the controller determines an allocated SSID to be used regarding the new flow and notifies the terminal of allocation information indicating a correspondence relationship between the new flow and the allocated SSID. In accordance with the allocation information, the terminal registers the correspondence relationship between the new flow and the allocated SSID on the flow SSID information. The terminal refers to the flow SSID information and uses the allocated SSID corresponding to the new flow to connect to an access point of the wireless LAN.

6 Claims, 13 Drawing Sheets

(51) Int. Cl.
*H04W 48/16* (2009.01)
*H04W 60/00* (2009.01)
*H04W 84/12* (2009.01)

(56) References Cited

U.S. PATENT DOCUMENTS

| | | | |
|---|---|---|---|
| 2005/0185626 A1* | 8/2005 | Meier et al. | 370/338 |
| 2005/0215279 A1 | 9/2005 | Shim et al. | |
| 2005/0232209 A1* | 10/2005 | Buckley et al. | 370/338 |
| 2006/0268767 A1* | 11/2006 | Sato et al. | 370/328 |
| 2008/0013545 A1 | 1/2008 | Ono et al. | |
| 2010/0265894 A1 | 10/2010 | Ebata et al. | |
| 2012/0076117 A1* | 3/2012 | Montemurro et al. | 370/338 |
| 2012/0257565 A1* | 10/2012 | Laroche et al. | 370/328 |

OTHER PUBLICATIONS

Nick McKeown et al., "OpenFlow: Enabling Innovation in Campus Networks", ACM SIGCOMM Computer Communication Review, vol. 38, No. 2, 2008. (http://www.openflowswitch.org//documents/openflow-wp-latest.pdf).
English translation of PCT/ISA/237 (written opinion of the international searching authority, dated Aug. 14, 2012).
PCT/IB/373 dated Nov. 19, 2013.
Extended European Search Report dated Mar. 20, 2015.
"OpenFlow Switch Specification", Version 1.1.0 Implemented (Wire Protocol 0x02) Feb. 28, 2011, pp. 1-56, Retrieved from Internet: URL: http://archive.openflow.org/documents/openflow-spec-v1.1.0.pdf.

* cited by examiner

NETWORK COMMUNICATION SYSTEM AND TERMINAL

TECHNICAL FIELD

The present invention relates to a technique of network communication using an access ID as represented by a wireless LAN (Local Area Network) communication using an SSID (Service Set Identifier).

BACKGROUND ART

In recent years, a large number of wireless LAN access points are installed in an urban district and various wireless LAN communication services are provided. Usually, an access ID called an SSID (Service Set Identifier) is set in the access point. Connecting to an access point requires the SSID set in the access point. In general, the SSID varies between services. A mobile terminal connects to an access point with designating the corresponding SSID to utilize a desired wireless LAN communication service. Here, setting of the SSID in the mobile terminal is in general performed manually or in a setting site.

Non-Patent Literature 1 (NPL1) describes a technique called "OpenFlow". In the OpenFlow, route control, failure recovery, load distribution and optimization are performed on an individual flow basis. A controller and a switch used in the OpenFlow are called an OpenFlow controller (OFC: OpenFlow Controller) and an OpenFlow switch (OFS: OpenFlow Switch), respectively.

The OpenFlow switch is provided with a flow table that indicates a correspondence relationship between a "match condition" and an "action", and operates in accordance with the flow table. More specifically, when receiving a packet, the OpenFlow switch refers to the flow table to search the flow table for an entry that matches the received packet. If an entry matching the received packet is registered on the flow table, the OpenFlow switch executes processing designated by the action of the matching entry on the received packet. Typically, the OpenFlow switch forwards the received packet to an output port designated by the action.

It is the OpenFlow controller that controls the flow table of the OpenFlow switch. That is, the OpenFlow controller instructs the OpenFlow switch to carry out such processing as new entry addition, entry change and entry deletion and thereby controls an operation of the OpenFlow switch For example, if there is no matching entry in the flow table, the OpenFlow switch requests the OpenFlow controller for entry setting. In response to the entry setting request, the OpenFlow controller designs an appropriate new entry. Then, the OpenFlow controller instructs the OpenFlow switch to add the new entry to the flow table.

CITATION LIST

Non Patent Literature

[NPL 1] Nick McKeown et al., "OpenFlow: Enabling Innovation in Campus Networks", ACM SIGCOMM Computer Communication Review, Vol. 38, No. 2, 2008. (http://www.openflowswitch.org//documents/openflow-wp-latest.pdf)

SUMMARY OF INVENTION

As described above, setting of the SSID in a terminal performing wireless LAN communication is in general performed manually or in a setting site. In either case, the setting of the SSID is troublesome and an operation of connecting to the access point is complicated.

An object of the present invention is to provide a new method for setting an SSID in a terminal that performs wireless LAN communication.

Another object of the present invention is to provide a new method for setting an access ID in a communication device that accesses a communication network by using the access ID.

In an aspect of the present invention, a network communication system is provided. The network communication system has: a terminal configured to perform communication through a wireless LAN; and a controller communicatively connected to the terminal. The terminal retains flow SSID information indicating a correspondence relationship between each flow and SSID. When initiating communication of a new flow, the terminal transmits an allocation request to the controller, wherein the allocation request requests for determination of an SSID to be used. In response to the allocation request, the controller determines an allocated SSID to be used regarding the new flow and notifies the terminal of allocation information indicating a correspondence relationship between the new flow and the allocated SSID. In accordance with the allocation information, the terminal registers the correspondence relationship between the new flow and the allocated SSID on the flow SSID information. The terminal refers to the flow SSID information and uses the allocated SSID corresponding to the new flow to connect to an access point of the wireless LAN.

In another aspect of the present invention, a terminal that performs communication through a wireless LAN is provided. The terminal has a flow control unit configured to retain flow SSID information indicating a correspondence relationship between each flow and SSID. When initiating communication of a new flow, the flow control unit transmits an allocation request to a controller, wherein the allocation request requests for determination of an SSID to be used. An allocated SSID being an SSID to be used regarding the new flow is determined by the controller in response to the allocation request. The flow control unit registers a correspondence relationship between the new flow and the allocated SSID on the flow SSID information. The flow control unit refers to the flow SSID information and uses the allocated SSID corresponding to the new flow to connect to an access point of the wireless LAN.

In still another aspect of the present invention, a network communication system is provided. The network communication system has: a communication device configured to access a communication network by using an access ID; and a controller communicatively connected to the communication device. The communication device retains flow access ID information indicating a correspondence relationship between each flow and access ID. When initiating communication of a new flow, the communication device transmits an allocation request to the controller, wherein the allocation request requests for determination of an access ID to be used. In response to the allocation request, the controller determines an allocated access ID to be used regarding the new flow and notifies the communication device of allocation information indicating a correspondence relationship between the new flow and the allocated access ID. In accordance with the allocation information, the communication device registers the correspondence relationship between the new flow and the allocated access ID on the flow access ID information. The communication device refers to the flow access ID information and uses the allocated access ID corresponding to the new flow to access the communication network.

According to the present invention, the SSID to be used by the terminal in the wireless LAN communication is determined (designated) by the controller with respect to each flow. Processing of setting the SSID in the terminal is automatically performed by the controller and the terminal. Therefore, the complicated operation regarding the SSID setting can be avoided. Furthermore, it is possible to dynamically change the SSID with respect to each flow.

DESCRIPTION OF EMBODIMENTS

Exemplary embodiments of the present invention will be described with reference to the attached drawings.

1. First Exemplary Embodiment 1-1. Outline

Figure 1:
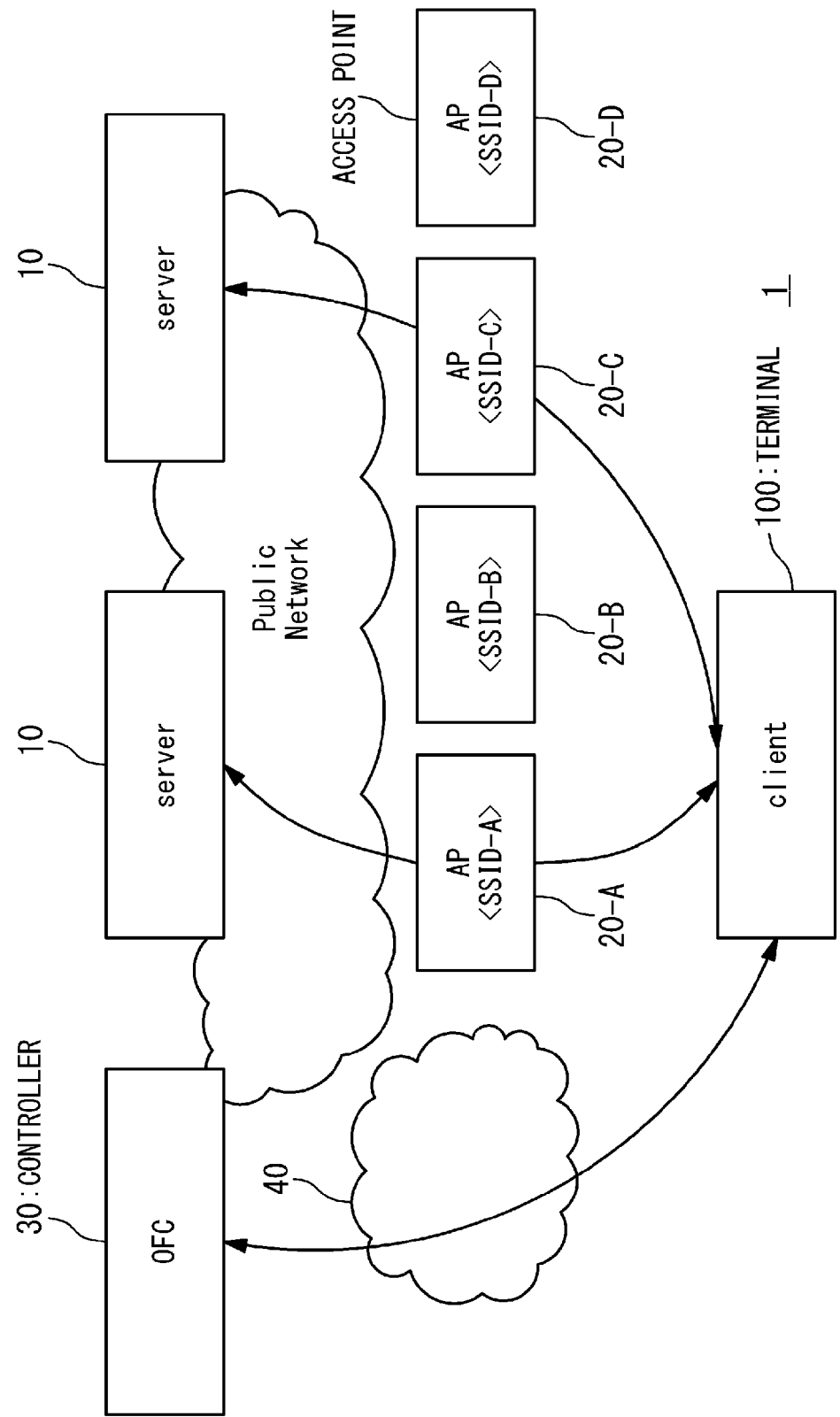
FIG. 1 is a schematic diagram showing a configuration of a network communication system according to a first exemplary embodiment of the present invention.

FIG. 1 is a schematic diagram showing a configuration of a network communication system 1 according to a first exemplary embodiment. In the first exemplary embodiment, the network communication system 1 is a wireless LAN communication system. More specifically, the network communication system 1 has at least one access point 20 of a wireless LAN and a terminal 100 (typically a mobile terminal) that performs communication through the wireless LAN.

The terminal 100 as a client connects to any access point 20 and performs communication with a server 10 on a network through the access point 20. Connecting to the access point 20 requires an SSID set in the access point. The SSID is set individually with respect to each access point 20. In the case of the example shown in FIG. 1, the SSIDs of the access points 20-A, 20-B, 20-C and 20-D are "SSID-A", "SSID-B", "SSID-C" and "SSID-D", respectively.

According to the present exemplary embodiment, the SSID to be used by the terminal 100 is determined (designated) by a controller 30 provided outside of the terminal 100. More specifically, the controller 30 and the terminal 100 are communicatively connected with each other through a communication network 40 (for example, 3G network). When initiating communication of a new flow, the terminal 100 transmits an "allocation request REQ" to the controller 30 through the communication network 40. The allocation request REQ requests for determination of an SSID to be used. In response to the allocation request REQ, the controller 30 determines an SSID (hereinafter referred to as an "allocated SSID") to be used regarding the new flow. Then, the controller 30 notifies the terminal 100 of "allocation information ALC" indicating a correspondence relationship between the new flow and the allocated SSID. It should be noted that an OpenFlow controller (OFC) may be used as the controller 30, for example.

Figure 2:
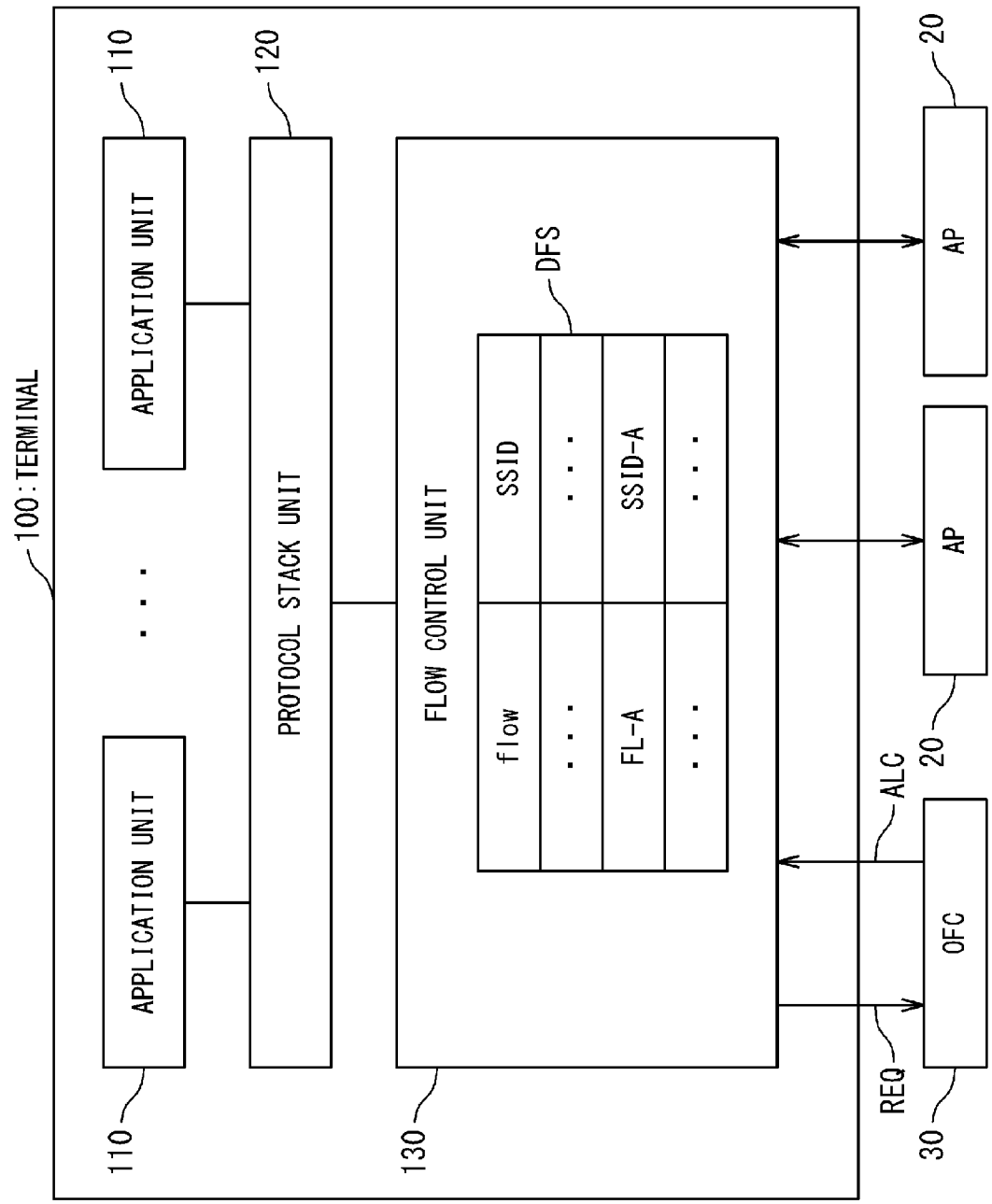
FIG. 2 is a block diagram schematically showing a configuration of a terminal according to the first exemplary embodiment.

FIG. 2 is a block diagram schematically showing a configuration of the terminal 100 according to the present exemplary embodiment. The terminal 100 has an application unit 110, a protocol stack unit 120 and a flow control unit 130. The application unit 110 performs data processing of an application. The protocol stack unit 120 generates a packet depending on data output from the application unit 110 and outputs the generated packet to the flow control unit 130. Moreover, the protocol stack unit 120 receives a packet from the flow control unit 130 and outputs data depending on the received packet to the application unit 110.

The flow control unit 130 manages the flow and the SSID. More specifically, the flow control unit 130 retains flow SSID information DFS indicating a correspondence relationship between each flow and the allocated SSID. In FIG. 2, for example, a flow (FL-A) and an SSID (SSID-A) are associated with each other. The flow control unit 130 can recognize the allocated SSID to be used regarding a target flow by reference to the flow SSID information DFS.

Figure 3:
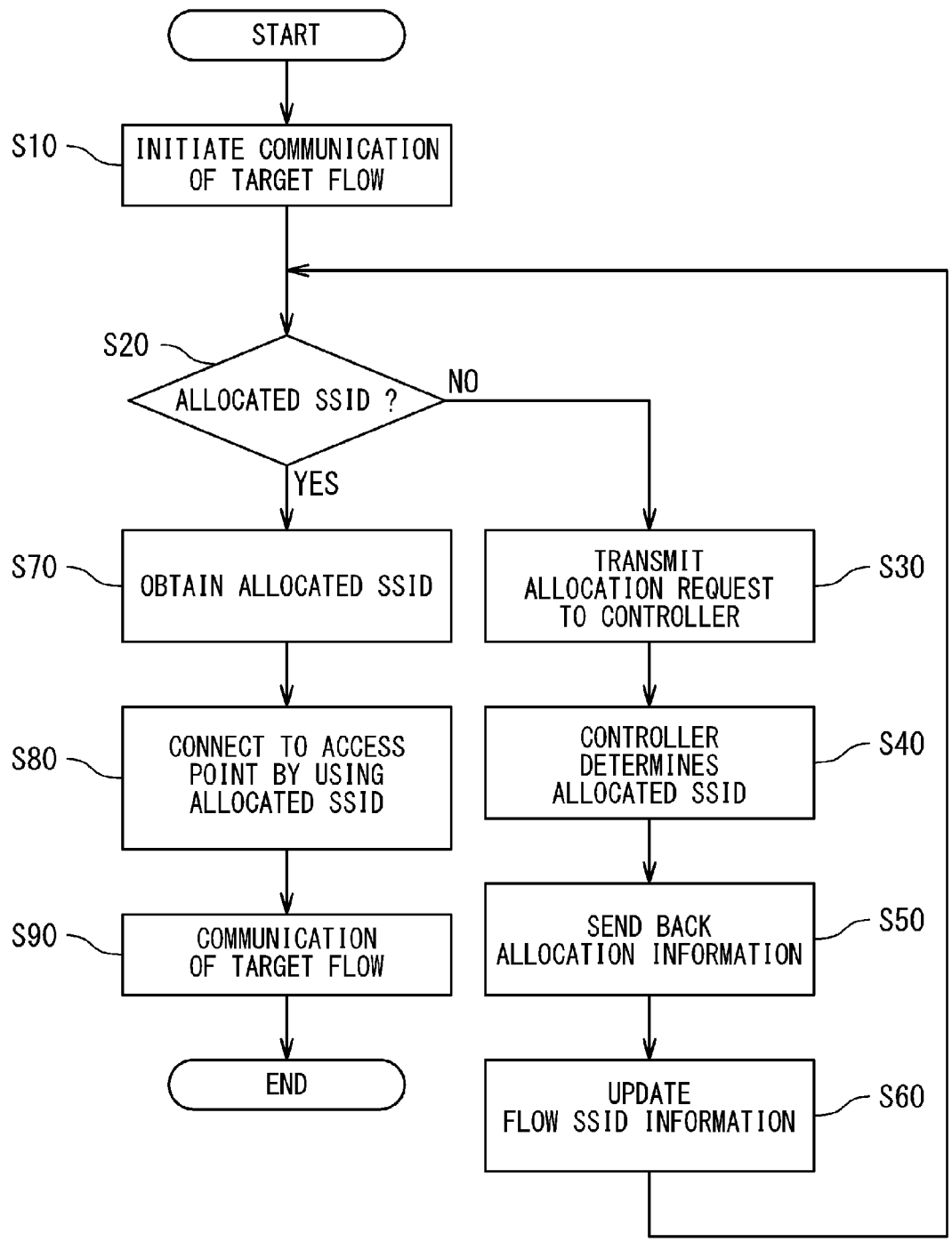
FIG. 3 is a flow chart showing communication processing in the first exemplary embodiment.

FIG. 3 is a flow chart showing communication processing in the present exemplary embodiment. The communication processing flow in the present exemplary embodiment will be described with reference to FIGS. 2 and 3.

First, the application unit 110 of the terminal 100 initiates communication of a target flow (Step S10). The flow control unit 130 refers to the flow SSID information DFS to determine whether or not the allocated SSID to be used regarding the target flow is already designated (Step S20).

If the target flow is a new flow, the allocated SSID is not yet designated (Step S20; No). In this case, the flow control unit 130 transmits the allocation request REQ requesting for determination of the allocated SSID to the controller 30 through the communication network 40 (Step S30).

In response to the allocation request REQ from the terminal 100, the controller 30 determines the allocated SSID regarding the new flow (Step S40). Then, the controller 30 transmits the allocation information ALC indicating a correspondence relationship between the new flow and the allocated SSID to the terminal 100 through the communication network 40 (Step S50).

The flow control unit 130 of the terminal 100 receives the allocation information ALC from the controller 30. In accordance with the allocation information ALC, the flow control unit 130 registers the correspondence relationship between the new flow and the allocated SSID on the flow SSID information DFS. That is, the flow control unit 130 updates the flow SSID information DFS to reflect the allocation information ALC (Step S60). After that, the processing returns back to Step S20.

If the allocated SSID regarding the target flow is already designated (Step S20; Yes), the flow control unit 130 obtains the allocated SSID from the flow SSID information DFS (Step S70). Then, the flow control unit 130 uses the allocated SSID to connect to the access point 20 of the wireless LAN (Step S80). The flow control unit 130 performs the communication of the target flow through the access point 20 (Step S90).

According to the present exemplary embodiment, as described above, the SSID to be used by the terminal 100 in the wireless LAN communication is determined (designated) by the controller 30 with respect to each flow. The processing of setting the SSID in the terminal 100 is automatically performed by the controller 30 and the terminal 100. Therefore, the complicated operation regarding the SSID setting can be avoided.

Moreover, according to the present exemplary embodiment, it is possible to designate the SSID with respect to each flow (application). It is therefore possible to use different SSIDs (access points 20) depending on applications. In other words, the SSID (access point 20) used by the terminal 100 is not fixed statically but can be changed dynamically. Furthermore, in a case where a plurality of applications are used concurrently, the terminal 100 can use different SSIDs for the respective applications to connect to a plurality of different access points 20 at the same time.

In addition, according to the present exemplary embodiment, a business operator can manage and dynamically control the SSID with respect to each flow (application) through the controller 30. For example, a business operator carrying on a service can permit only connection by a specific SSID with regard to only an appropriate service. A business operator can perform optimum control of wireless resource operation through the controller 30.

1-2. Configuration Example

Figure 4:
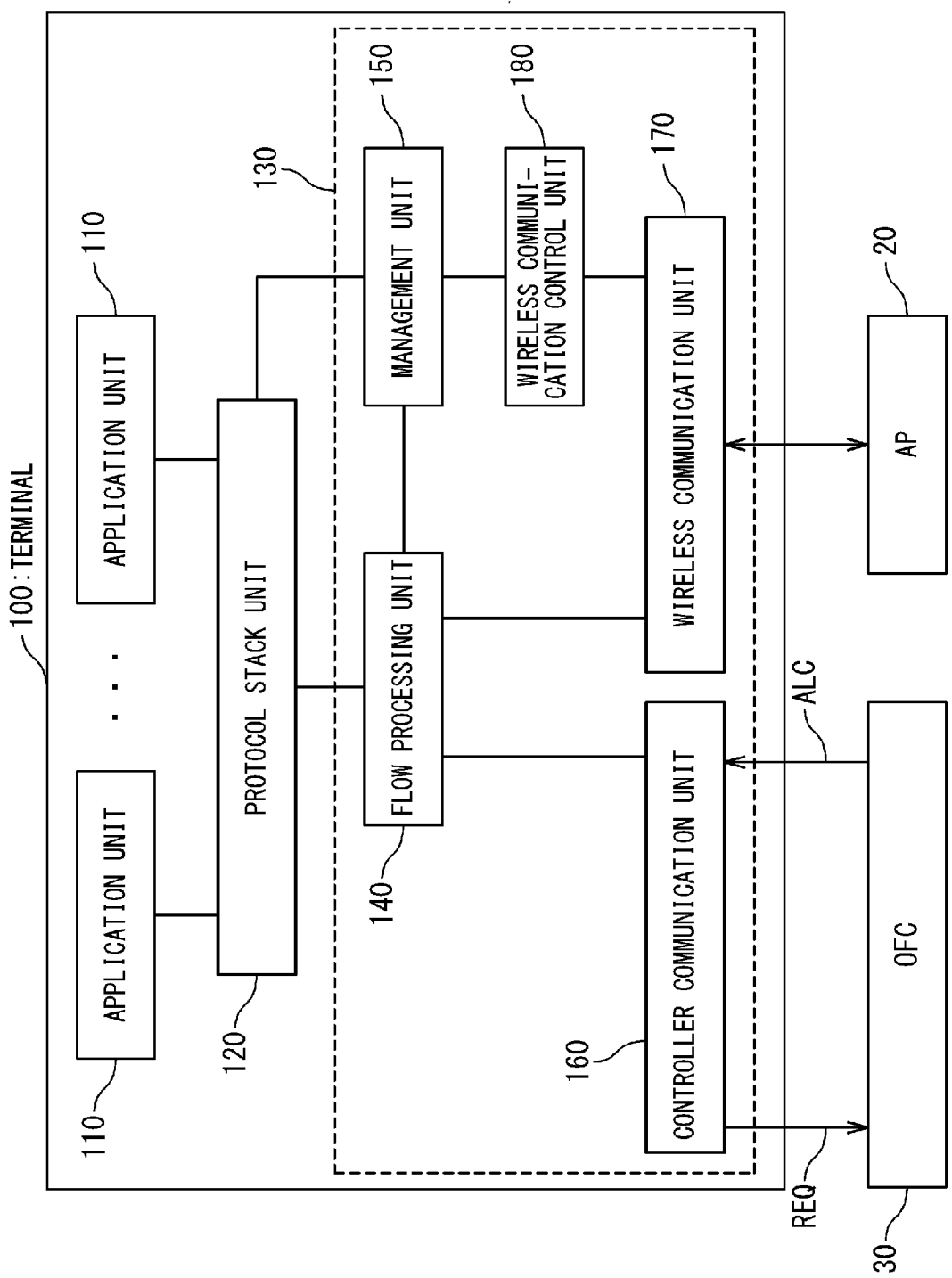
FIG. 4 is a block diagram showing a configuration example of the terminal according to the first exemplary embodiment.

FIG. 4 is a block diagram showing a configuration example of the terminal 100 according to the present exemplary embodiment. As shown in FIG. 4, the above-mentioned flow control unit 130 has a flow processing unit 140, a management unit 150, a controller communication unit 160, a wireless communication unit 170 and a wireless communication control unit 180. The controller communication unit 160 performs communication with the controller 30 through the communication network 40. The wireless communication unit 170 performs communication with the access point 20. Each unit can be achieved by cooperation of hardware and software.

Figure 5:
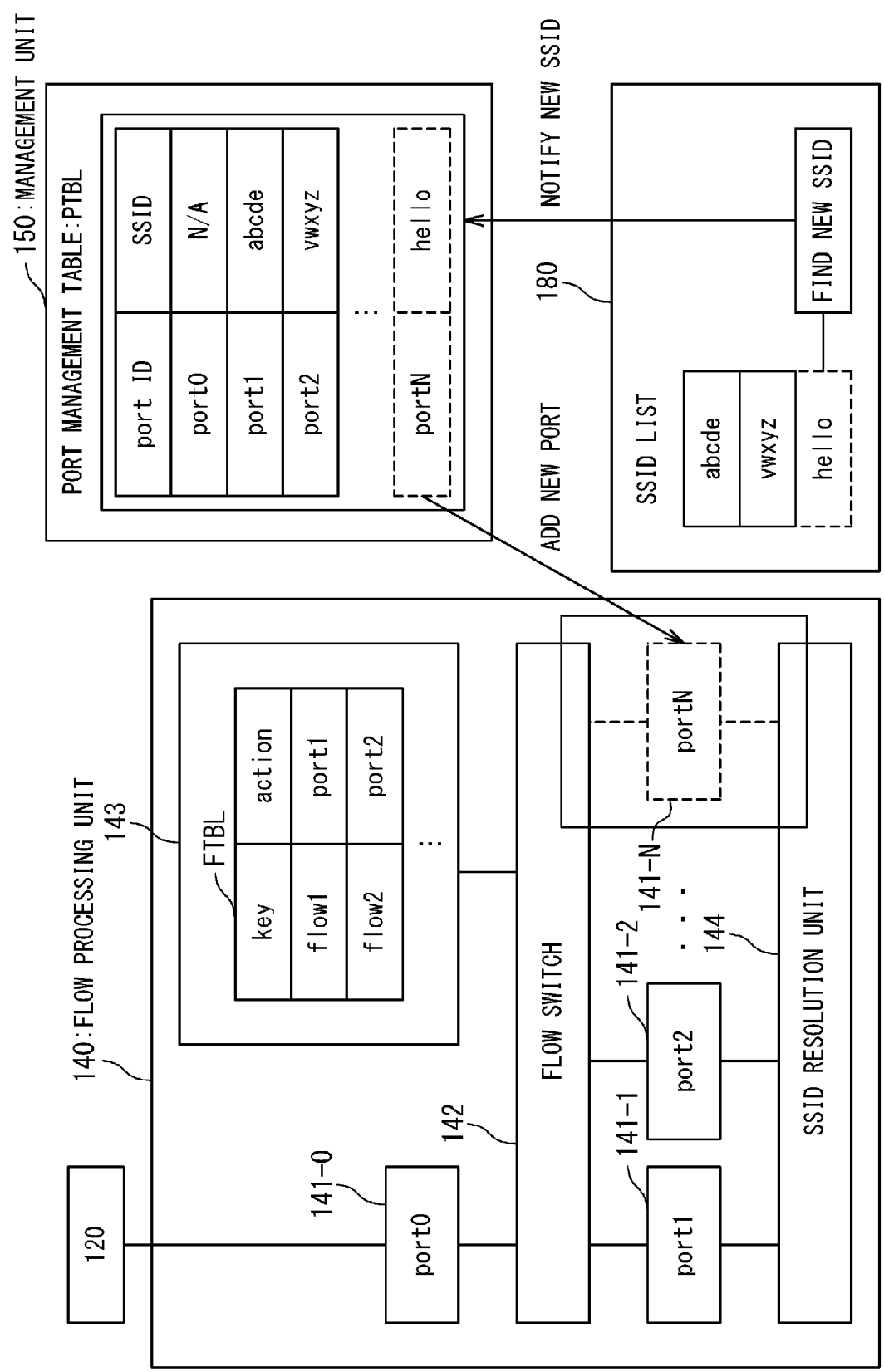
FIG. 5 is a block diagram showing a configuration example of a flow processing unit, a management unit and a wireless communication control unit in the first exemplary embodiment.

FIG. 5 is a block diagram showing a configuration example of the flow processing unit 140, the management unit 150 and the wireless communication control unit 180.

The flow processing unit 140 has the same function as that of an OpenFlow switch (OFS). More specifically, the flow processing unit 140 has a plurality of ports 141, a flow switch 142 and a flow table management unit 143. A port 141-0 is connected to the protocol stack unit 120 and used for packet transmission/reception to/from the protocol stack unit 120. When receiving a packet from any port, the flow switch 142 performs processing with respect to the received packet. In the packet processing, the flow switch 142 refers to a flow table FTBL managed by the flow table management unit 143.

The flow table management unit 143 manages the flow table FTBL. The flow table FTBL indicates a correspondence relationship between match condition (key) and action. The match condition (key) is identification information of flow and defined by an input port and one or more fields included in a packet header. The action designates packet processing that is performed with respect to a packet belonging to a flow matching the match condition. In particular, in the present exemplary embodiment, the action designates an output port being an output destination of the received packet. That is, it can be said that the flow table FTBL indicates a correspondence relationship between each flow and port (output port).

When receiving a packet, the flow switch 142 refers to the flow table FTBL to retrieve a flow entry matching the received packet from the flow table FTBL. The flow entry matching the received packet is hereinafter referred to as a "match entry". In a case where a match entry is registered on the flow table FTBL, the output port designated by the action of the match entry is a designated port. In this case, the flow switch 142 outputs the received packet to the designated port.

It should be noted that in the example shown in FIG. 5, the flow processing unit 140 further has an SSID resolution unit 144. The SSID resolution unit 144 receives a packet that is output from the flow switch 142 to the designated port. Then, the SSID resolution unit 144 obtains the allocated SSID by reference to a port management table PTBL managed by the management unit 150. The details will be described later.

The management unit 150 manages the port 141 and the SSID. More specifically, the management unit 150 retains the port management table PTBL indicating a correspondence relationship between each port 141 and SSID.

The wireless communication control unit 180 has a function of controlling wireless communication by the wireless communication unit 170. Furthermore, the wireless communication control unit 180 has a function of scanning the SSID of the access point 20 around the terminal 100 by using the wireless communication unit 170. When finding a new SSID (e.g. hello), the wireless communication control unit 180 adds the new SSID to an SSID list and notifies the management unit 150 of the new SSID.

When the new SSID is notified, the management unit 150 adds a new port 141 (e.g. 141-N) to the flow processing unit 140. Then, the management unit 150 allocates the new port 141 to the new SSID and adds a new entry indicating a correspondence relationship between the new port 141 and the new SSID to the port management table PTBL. That is, the management unit 150 manages the correspondence relationship between the SSID and the port 141.

Moreover, at a predetermined timing, the management unit 150 notifies the controller 30 of the SSID that the management unit 150 manages (knows). Here, the management unit 150 communicates with the controller 30 by using the controller communication unit 160.

As described above, the flow table FTBL indicates the correspondence relationship between each flow and port 141, and the port management table PTBL indicates the correspondence relationship between each port 141 and SSID. Therefore, it can be said that the above-mentioned flow SSID information DFS (see FIG. 2) indicating the correspondence relationship between each flow and SSID is a combination of the flow table FTBL and the port management table PTBL.

Figure 6:
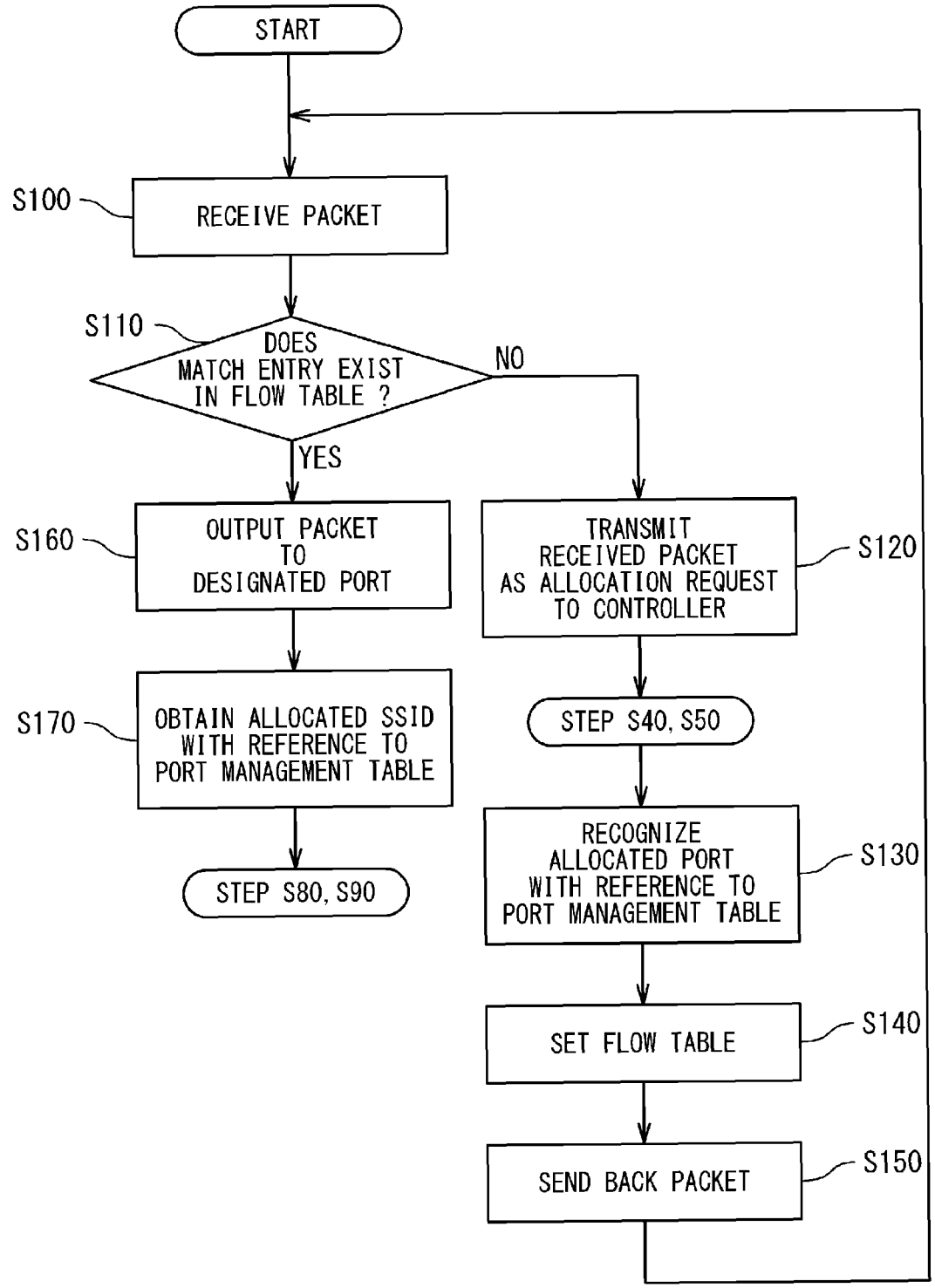
FIG. 6 is a flow chart showing communication processing in the first exemplary embodiment.
Figure 7:
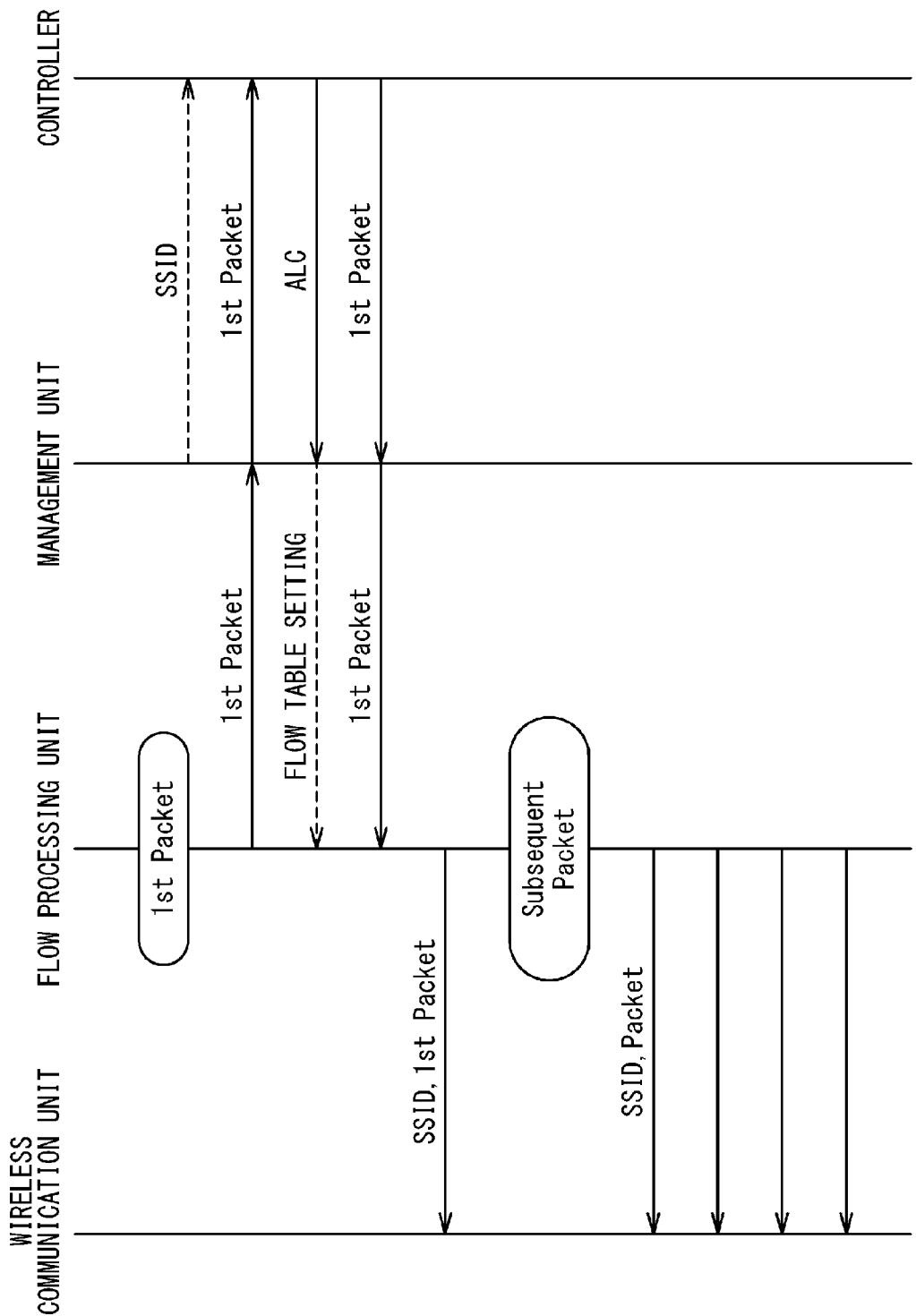
FIG. 7 is a conceptual diagram showing the communication processing in the first exemplary embodiment.

FIG. 6 is a flow chart showing communication processing in the present exemplary embodiment. FIG. 7 is a conceptual diagram showing the communication processing in the present exemplary embodiment. The communication processing flow in the present exemplary embodiment will be described with reference to FIGS. 4 to 7.

First, the application unit 110 of the terminal 100 initiates communication of a new flow. The flow processing unit 140 receives a first packet (1st packet) of the new flow from the protocol stack unit 120 (Step S100).

When receiving the first packet, the flow switch 142 of the flow processing unit 140 determines whether or not the match entry is being registered on the flow table FTBL (Step S110). In the case of the first packet, the match entry does not yet exist (Step S110; No). In this case, the flow processing unit 140 outputs the first packet as the allocation request REQ to the management unit 150. The management unit 150 transmits the allocation request REQ to the controller 30 through the controller communication unit 160 (Step S120). At this time, the management unit 150 may notify the controller 30 of the SSID that the management unit 150 manages (knows) together with the allocation request REQ.

In response to the allocation request REQ from the terminal 100, the controller 30 determines an allocated SSID to be used regarding the new flow among the SSIDs notified from the management unit 150 (Step S40). Then, the controller 30 transmits the allocation information ALC indicating the correspondence relationship between the new flow and the allocated SSID to the terminal 100 through the communication network 40 (Step S50). At this time, the controller 30 may transmit credential (such as WEP key) together with the allocation information ALC to the terminal 100, if necessary.

The management unit 150 of the terminal 100 receives the allocation information ALC from the controller 30 through the controller communication unit 160. The port 141 corresponding to the allocated SSID indicated by the allocation information ALC is hereinafter referred to as an "allocated port". The management unit 150 can recognize the allocated port corresponding to the allocated SSID by reference to the port management table PTBL (Step S130).

Subsequently, the management unit 150 instructs the flow processing unit 140 to set a new flow entry indicating a correspondence relationship between the new flow and the allocated port in the flow table FTBL. In accordance with the instruction from the management unit 150, the flow processing unit 140 registers the new flow entry on the flow table FTBL (Step S140).

Furthermore, the controller 30 sends the first packet received as the allocation request REQ from the terminal 100 back to the terminal 100 (Step S150). The timing of sending back the first packet is after the transmission of the allocation information ALC to the terminal 100, and preferably after the new flow entry is set in the flow table FTBL. The management unit 150 of the terminal 100 receives the first packet from the controller 30 through the controller communication unit 160. The management unit 150 further forwards the first packet to the flow processing unit 140.

The flow processing unit 140 receives the first packet again as a received packet (Step S100). When receiving a packet, the flow switch 142 determines whether or not the match entry is being registered on the flow table FTBL (Step S110). This time, the match entry (i.e. the above-mentioned new flow entry) is already registered on the flow table FTBL (Step S110; Yes). In this case, the flow switch 142 outputs the received packet to the designated port designated by the match entry (Step S160).

The SSID resolution unit 144 receives the packet that is output from the flow switch 142 to the designated port. Then, the SSID resolution unit 144 refers to the port management table PTBL of the management unit 150 to obtain the SSID corresponding to the designated port (Step S170). This SSID is the allocated SSID regarding the target flow. The SSID resolution unit 144 transmits the packet and the allocated SSID to the wireless communication unit 170.

The wireless communication unit 170 accesses the access point 20 of the wireless LAN by using the allocated SSID (Step S80). Then, the wireless communication unit 170 performs the communication of the target flow through the access point 20 (Step S90). More specifically, the wireless communication unit 170 transmits the packet output from the designated port. It should be noted that with regard to subsequent packets subsequent to the first packet, the transmission processing is performed without through the management unit 150 and the controller 30.

In the case of the example shown in FIG. 5, the configuration of the flow processing unit 140 is the same as that of a typical OpenFlow switch (OFS) except for the SSID resolution unit 144. It is therefore possible to construct the flow processing unit 140 by using an existing OpenFlow switch, which is preferable.

1-3. Modification Example

Figure 8:
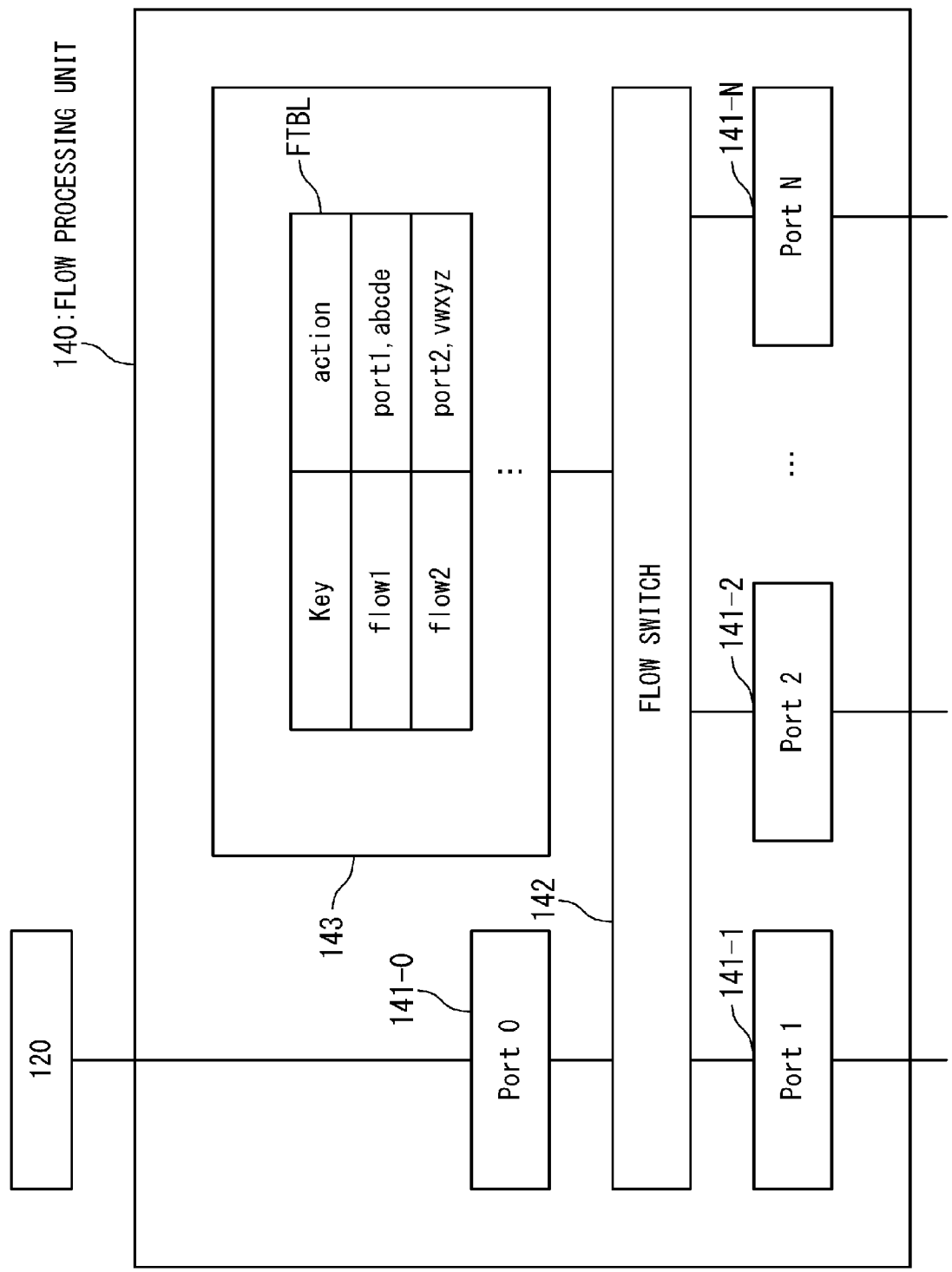
FIG. 8 is a block diagram showing a modification example of the first exemplary embodiment.

FIG. 8 shows a modification example of the flow processing unit 140. In the present modification example, not only the output port but also the allocated SSID is set in the action of the flow table FTBL. In this case, the flow switch 142 reads the allocated SSID from the match entry and outputs the allocated SSID together with the packet to the designated port. The packet and the allocated SSID are input to the wireless communication unit 170. According to the present modification example, the SSID resolution unit 144 can be omitted.

2. Second Exemplary Embodiment

The application of the present invention is not limited to the wireless LAN communication using the SSID. For example, let us consider a case where the access point of the wireless LAN is replaced with an internet service provider (ISP). Even in this case, the internet service provider as a connection target can be designated with respect to each flow by the controller 30. Such the case is considered in a second exemplary embodiment.

Figure 9:
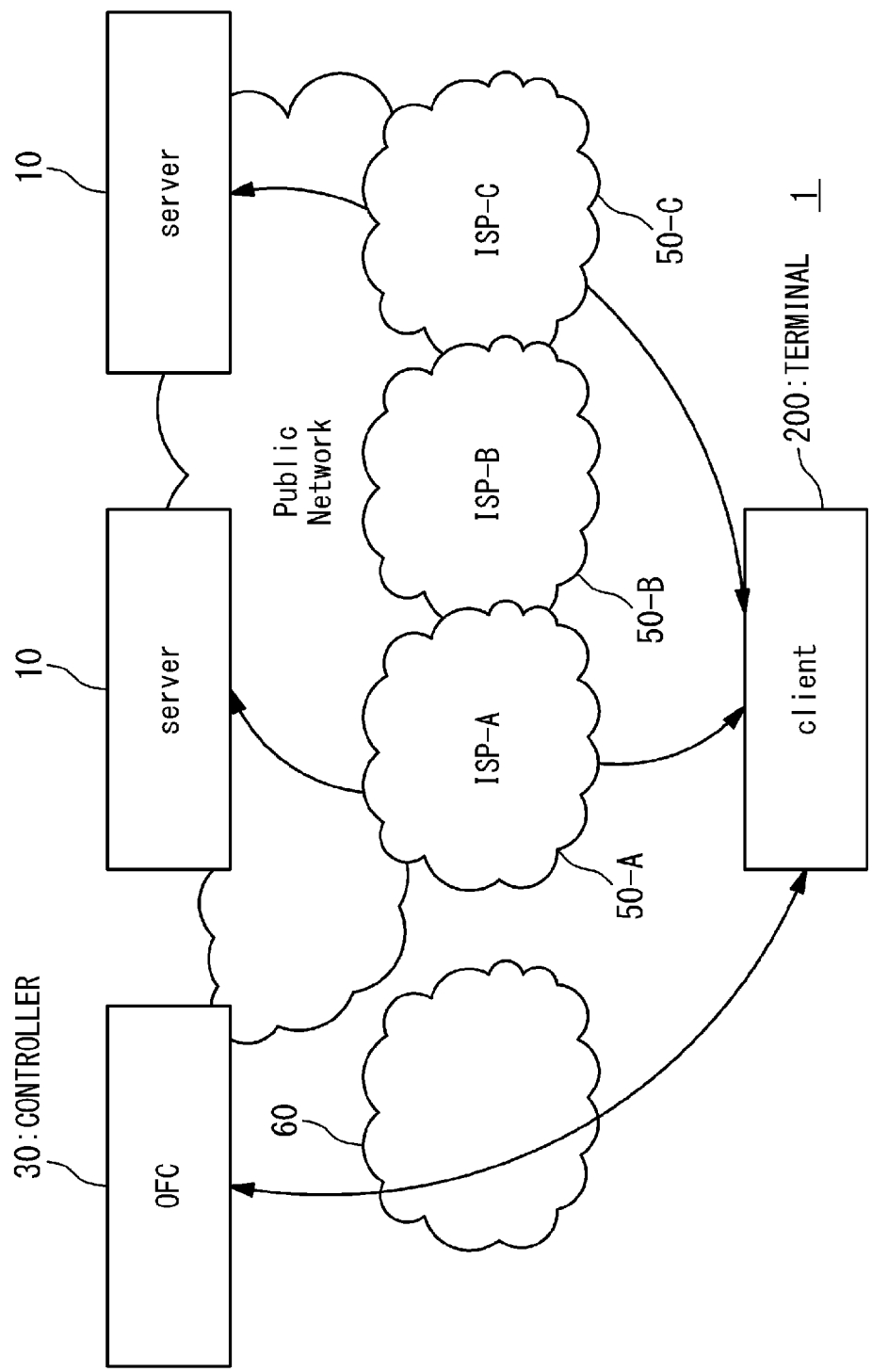
FIG. 9 is a schematic diagram showing a configuration example of a network communication system according to a second exemplary embodiment of the present invention.

FIG. 9 is a schematic diagram showing a configuration example of a network communication system 1 according to the second exemplary embodiment. A terminal 200 (typically, PC) as a client connects to any internet service provider 50 and performs communication with a server 10 on a network through the internet service provider 50.

The internet service provider 50 that the terminal 200 should connect to is determined (designated) by a controller 30. More specifically, the controller 30 and the terminal 200 are communicatively connected with each other through a communication network 60. When initiating communication of a new flow, the terminal 200 transmits an "allocation request REQ" to the controller 30 through the communication network 60. The allocation request REQ requests for determination of an internet service provider 50 to be used. In response to the allocation request REQ, the controller 30 determines an internet service provider 50 (hereinafter referred to as an "allocated ISP") to be used regarding the new flow. Then, the controller 30 notifies the terminal 200 of "allocation information ALC" indicating a correspondence relationship between the new flow and the allocated ISP.

Figure 10:
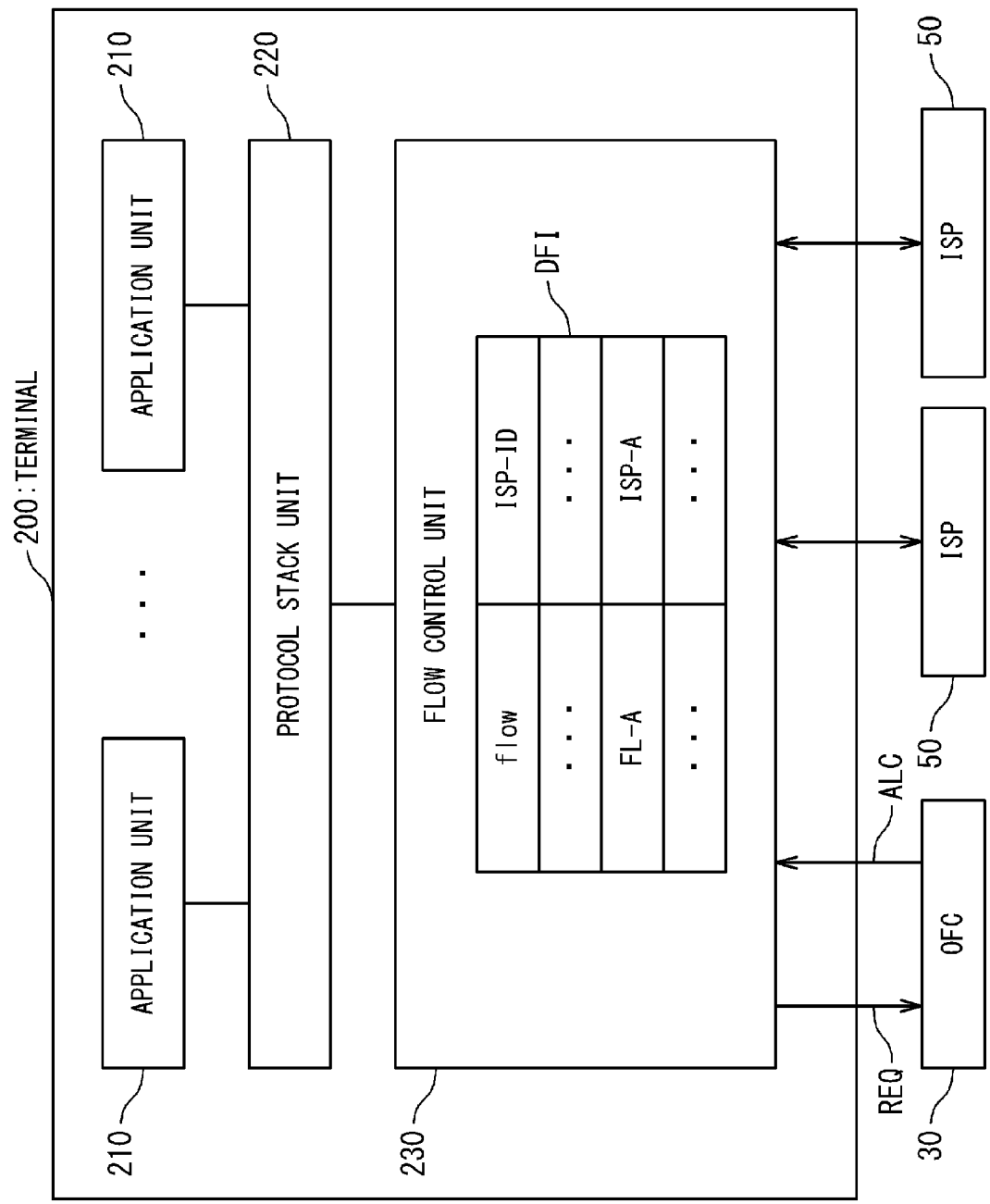
FIG. 10 is a block diagram schematically showing a configuration of a terminal in the network communication system shown in FIG. 9.

FIG. 10 is a block diagram schematically showing a configuration of the terminal 200 according to the present exemplary embodiment. The terminal 200 has an application unit 210, a protocol stack unit 220 and a flow control unit 230. The flow control unit 230 manages the flow and the allocated ISP. More specifically, the flow control unit 230 retains flow ISP information DFI indicating a correspondence relationship between each flow and the allocated ISP (ID information thereof). The flow control unit 230 can recognize the allocated ISP (ID information thereof) to be used regarding a target flow by reference to the flow ISP information DFI.

The detailed processing flow is the same as that in the case of the first exemplary embodiment. In the present exemplary embodiment, the same effects as those in the first exemplary embodiment can also be obtained.

Figure 11:
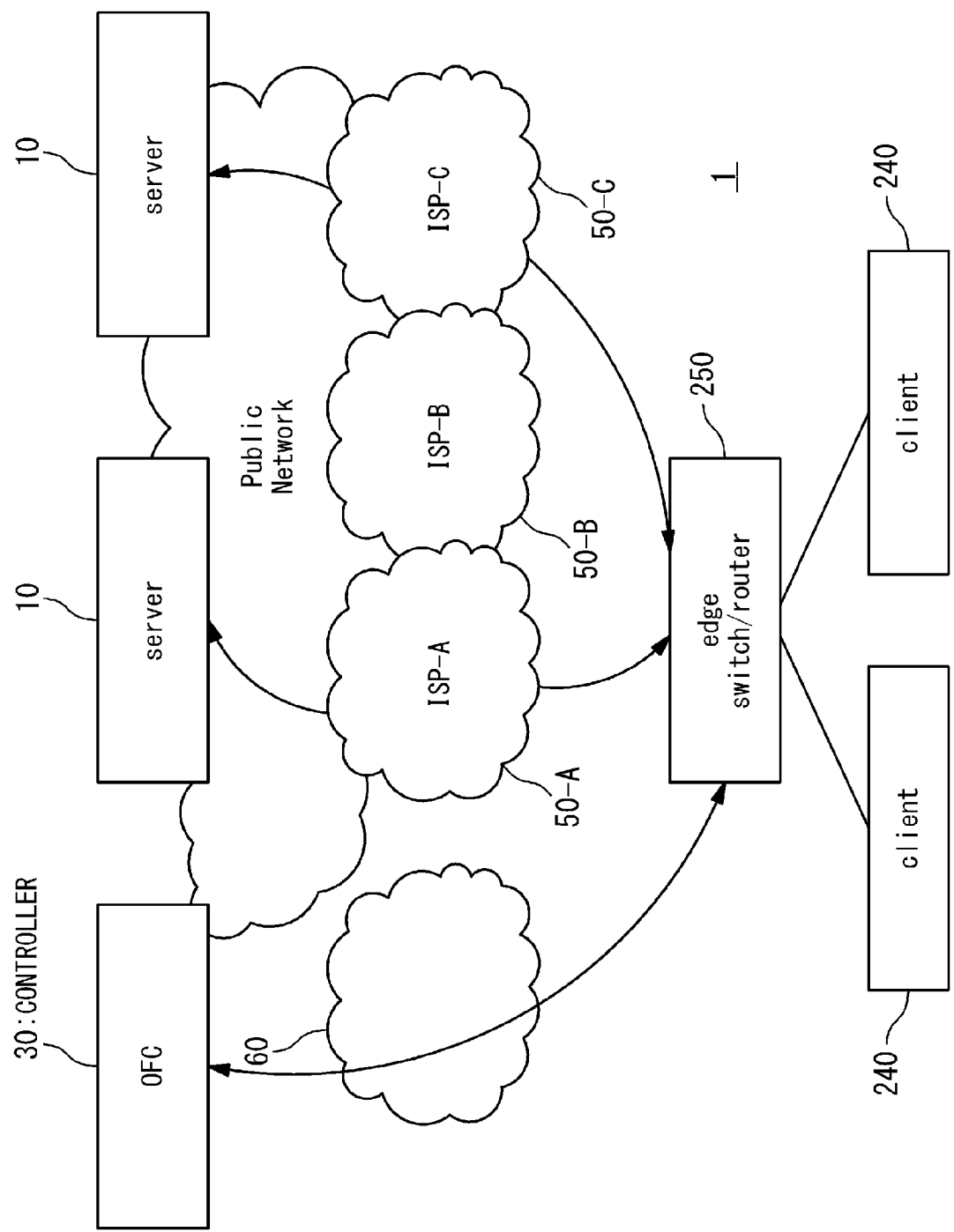
FIG. 11 is a block diagram showing a modification example of the second exemplary embodiment.
Figure 12:
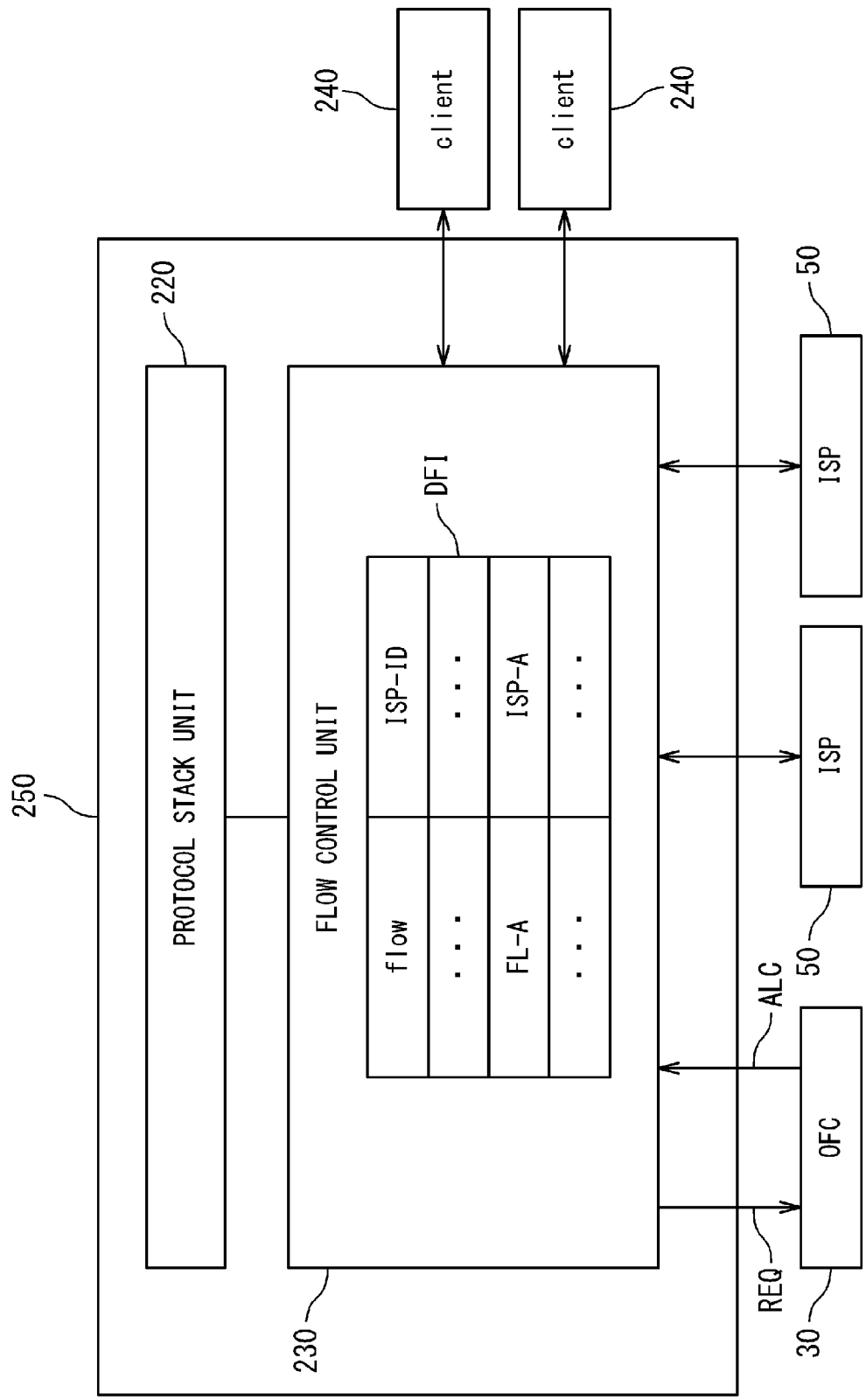
FIG. 12 is a block diagram schematically showing a configuration of an edge switch in the network communication system shown in FIG. 11.

FIGS. 11 and 12 show a modification example of the second exemplary embodiment. A terminal 240 as a client is connected to an edge switch (edge router) 250. The edge switch 250 and the controller 30 are communicatively connected with each other through the communication network 60. In this case, as shown in FIG. 12, the edge switch 250 has a configuration where the application unit 210 is omitted from the configuration of the terminal 200 shown in FIG. 10. The application unit 210 is provided in the terminal 240. The flow control unit 230 of the edge switch 250 performs communication with the terminal 240. Even in such the configuration, the same processing flow can be applied.

3. Third Exemplary Embodiment

Figure 13:
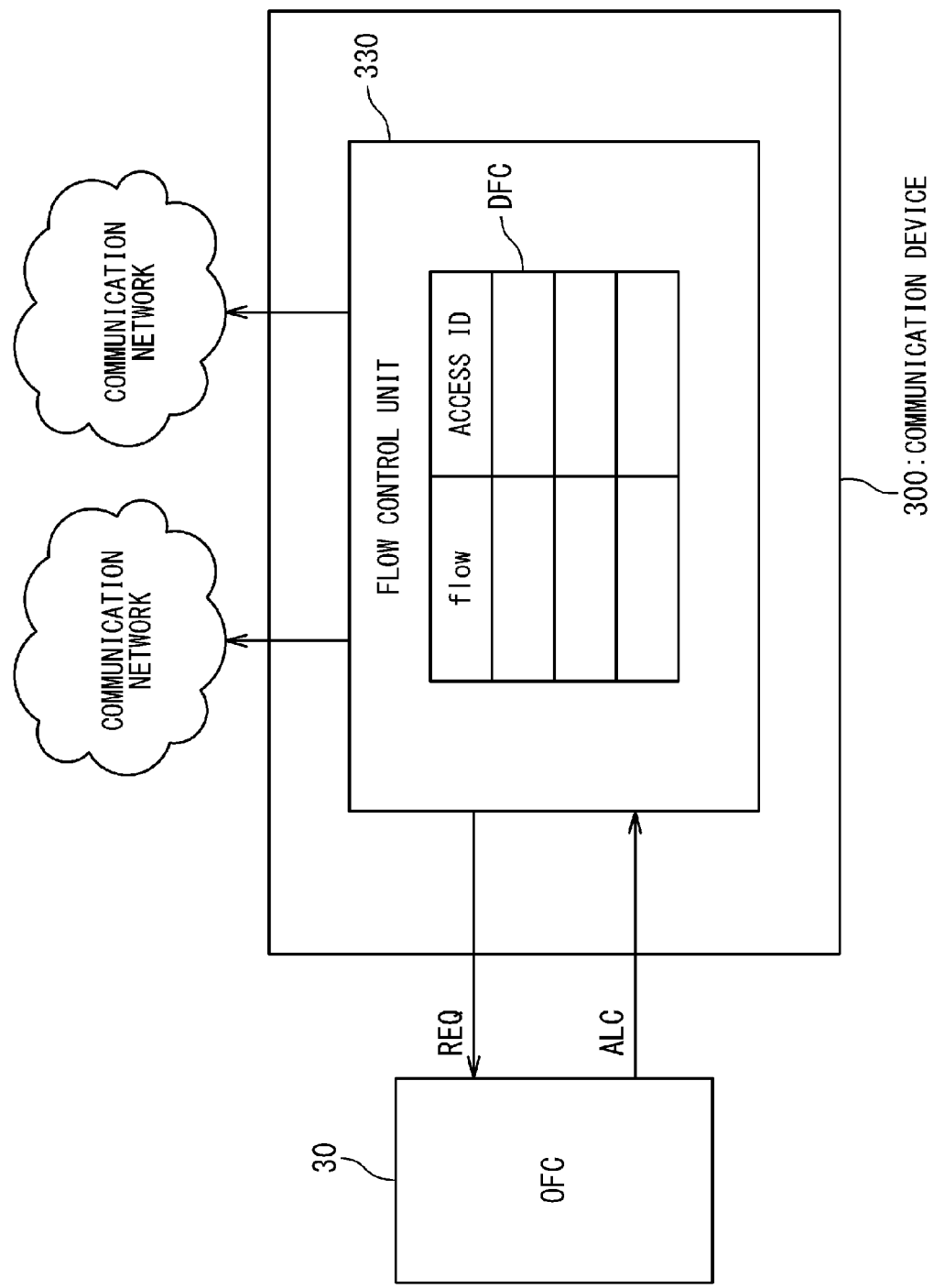
FIG. 13 is a schematic diagram showing a configuration of a network communication system according to a third exemplary embodiment of the present invention.

FIG. 13 shows a more generalized configuration of the above-described first and second exemplary embodiments. A communication device 300 accesses a communication network by using an access ID. The communication device 300 is exemplified by a mobile terminal, a PC, an edge switch and the like. The access ID is exemplified by an SSID required for connecting to an access point of a wireless LAN and ID information of an internet service provider.

The access ID to be used by the communication device 300 at communication is determined (designated) by a controller 30 provided outside of the communication device 300. More specifically, the controller 30 and the communication device 300 are communicatively connected with each other through a communication network. When initiating communication of a new flow, the communication device 300 transmits an "allocation request REQ" to the controller 30. The allocation request REQ requests for determination of an access ID to be used. In response to the allocation request REQ, the controller 30 determines an access ID (hereinafter referred to as an "allocated access ID") to be used regarding the new flow. Then, the controller 30 notifies the communication device 300 of "allocation information ALC" indicating a correspondence relationship between the new flow and the allocated access ID.

The communication device 300 has a flow control unit 330 that manages the flow and the allocated access ID. More specifically, the flow control unit 330 retains flow access ID information DFC indicating a correspondence relationship between each flow and the allocated access ID. When receiving the allocation information ALC from the controller 30, the flow control unit 330 registers the correspondence relationship between the new flow and the allocated access ID on the flow access ID information DFC to update the flow access ID information DFC.

The flow control unit 330 can recognize the allocated access ID corresponding to a target flow by reference to the flow access ID information DFC. The flow control unit 330 accesses the communication network by using the allocated access ID. Then, the flow control unit 330 performs communication of the target flow through the communication network.

The detailed processing flow is the same as that in the case of the first exemplary embodiment.

According to the present exemplary embodiment, as described above, the access ID to be used by the communication device 300 is determined (designated) by the controller 30 with respect to each flow (application). It is therefore possible to use different access IDs (communication network) depending on applications. In other words, the access ID (communication network) used by the communication device 300 is not fixed statically but can be changed dynamically.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

Supplementary Note 1

A network communication system comprising:
a terminal configured to perform communication through a wireless LAN; and
a controller communicatively connected to said terminal, wherein:
said terminal retains flow SSID information indicating a correspondence relationship between each flow and SSID;
when initiating communication of a new flow, said terminal transmits an allocation request to said controller, wherein said allocation request requests for determination of an SSID to be used;
said controller determines, in response to said allocation request, an allocated SSID to be used regarding said new flow and notifies said terminal of allocation information indicating a correspondence relationship between said new flow and said allocated SSID;
said terminal registers, in accordance with said allocation information, the correspondence relationship between said new flow and said allocated SSID on said flow SSID information; and
said terminal refers to said flow SSID information and uses said allocated SSID corresponding to said new flow to connect to an access point of said wireless LAN.

Supplementary Note 2

The network communication system according to Supplementary note 1,
wherein said terminal comprises:
a flow processing unit configured to retain a flow table indicating a correspondence relationship between each flow and port;
a management unit configured to retain a port management table indicating a correspondence relationship between each port and SSID; and
a wireless communication unit configured to perform communication with said access point,
wherein:
said flow SSID information is a combination of said flow table and said port management table;

when receiving a packet belonging to said new flow, said flow processing unit determines whether or not a flow entry regarding said new flow is registered on said flow table;

if the flow entry regarding said new flow is registered on said flow table, said flow processing unit outputs said packet to a designated port being a port designated by the registered flow entry and refers to said port management table to obtain said allocated SSID being an SSID corresponding to said designated port; and said wireless communication unit accesses said access point by using said allocated SSID and transmits said packet output from said designated port.

Supplementary Note 3

The network communication system according to Supplementary note 2,
wherein:
said terminal further comprises a controller communication unit configured to perform communication with said controller;

if the flow entry regarding said new flow is not registered on said flow table, said flow processing unit outputs said packet as said allocation request to said management unit;

said management unit transmits said allocation request to said controller through said controller communication unit and receives said allocation information from said controller through said controller communication unit;

said management unit refers to said port management table to recognize an allocated port being a port corresponding to said allocated SSID indicated by said allocation information;

said management unit instructs said flow processing unit to set a new flow entry indicating a correspondence relationship between said new flow and said allocated port in said flow table; and said flow processing unit registers said new flow entry on said flow table in accordance with the instruction from said management unit.

Supplementary Note 4

The network communication system according to Supplementary note 3,
wherein said controller transmits said allocation information to said terminal and then sends said packet received as said allocation request back to said terminal.

Supplementary Note 5

A terminal that performs communication through a wireless LAN,
said terminal comprising a flow control unit configured to retain flow SSID information indicating a correspondence relationship between each flow and SSID,
wherein:
when initiating communication of a new flow, said flow control unit transmits an allocation request to a controller, wherein said allocation request requests for determination of an SSID to be used;

an allocated SSID being an SSID to be used regarding said new flow is determined by said controller in response to said allocation request;

said flow control unit registers a correspondence relationship between said new flow and said allocated SSID on said flow SSID information; and said flow control unit refers to said flow SSID information and uses said allocated SSID corresponding to said new flow to connect to an access point of said wireless LAN.

Supplementary Note 6

A network communication system comprising:
a communication device configured to access a communication network by using an access ID; and
a controller communicatively connected to said communication device,
wherein:
said communication device retains flow access ID information indicating a correspondence relationship between each flow and access ID;

when initiating communication of a new flow, said communication device transmits an allocation request to said controller, wherein said allocation request requests for determination of an access ID to be used;

said controller determines, in response to said allocation request, an allocated access ID to be used regarding said new flow and notifies said communication device of allocation information indicating a correspondence relationship between said new flow and said allocated access ID;

said communication device registers, in accordance with said allocation information, the correspondence relationship between said new flow and said allocated access ID on said flow access ID information; and said communication device refers to said flow access ID information and uses said allocated access ID corresponding to said new flow to access said communication network.

Supplementary Note 7

The network communication system according to Supplementary note 6,
wherein said access ID is an SSID required for connecting to an access point of a wireless LAN.

Supplementary Note 8

The network communication system according to Supplementary note 6,
wherein said access ID is ID information of an internet service provider.

This application is based upon and claims the benefit of priority from Japanese patent application No. 2011-210750 filed on May 17, 2011, the disclosure of which is incorporated herein in its entirely by reference.

EXPLANATION OF REFERENCE NUMERALS 1 network communication system
10 server
20 access point
30 controller
40 communication network
50 internet service provider
60 communication network
100 terminal
110 application unit
120 protocol stack unit
130 flow control unit
140 flow processing unit
141 port
142 flow switch
143 flow table management unit 144 SSID RESOLUTION UNIT
150 management unit
160 controller communication unit
170 wireless communication unit
180 wireless communication control unit
200 terminal
210 application unit
220 protocol stack unit
230 flow control unit
240 terminal
250 edge switch
300 communication device
330 flow control unit
DFS flow SSID information
DFI flow ISP information
DFC flow access ID information
REQ allocation request
ALC allocation information
FTBL flow table
PTBL port management table

The invention claimed is:

1. A network communication system comprising:
a terminal configured to perform communication through a wireless LAN; and
a controller communicatively connected to said terminal, wherein:
said terminal retains flow SSID information indicating a correspondence relationship between each flow and SSID;
when initiating communication of a new flow, said terminal transmits an allocation request to said controller, wherein said allocation request requests for determination of an SSID to be used;
said controller determines, in response to said allocation request, an allocated SSID to be used regarding said new flow and notifies said terminal of allocation information indicating a correspondence relationship between said new flow and said allocated SSID;
said terminal registers, in accordance with said allocation information, the correspondence relationship between said new flow and said allocated SSID on said flow SSID information; and
said terminal refers to said flow SSID information and uses said allocated SSID corresponding to said new flow to connect to an access point of said wireless LAN,
wherein said terminal comprises:
a flow processing unit configured to retain a flow table indicating a correspondence relationship between each flow and port;
a management unit configured to retain a port management table indicating a correspondence relationship between each port and SSID; and
a wireless communication unit configured to perform communication with said access point,
wherein:
said flow SSID information is a combination of said flow table and said port management table;
when receiving a packet belonging to said new flow, said flow processing unit determines whether or not a flow entry regarding said new flow is registered on said flow table;
if the flow entry regarding said new flow is registered on said flow table, said flow processing unit outputs said packet to a designated port being a port designated by the registered flow entry and refers to said port management table to obtain said allocated SSID being an SSID corresponding to said designated port; and
said wireless communication unit accesses said access point by using said allocated SSID and transmits said packet output from said designated port,
wherein:
said terminal further comprises a controller communication unit configured to perform communication with said controller;
if the flow entry regarding said new flow is not registered on said flow table, said flow processing unit outputs said packet as said allocation request to said management unit;
said management unit transmits said allocation request to said controller through said controller communication unit and receives said allocation information from said controller through said controller communication unit;
said management unit refers to said port management table to recognize an allocated port being a port corresponding to said allocated SSID indicated by said allocation information;
said management unit instructs said flow processing unit to set a new flow entry indicating a correspondence relationship between said new flow and said allocated port in said flow table; and
said flow processing unit registers said new flow entry on said flow table in accordance with the instruction from said management unit.

2. The network communication system according to claim 1,
wherein said controller transmits said allocation information to said terminal and then sends said packet received as said allocation request back to said terminal.

3. A terminal that performs communication through a wireless LAN,
said terminal comprising a flow control unit configured to retain flow SSID information indicating a correspondence relationship between each flow and SSID,
wherein:
when initiating communication of a new flow, said flow control unit transmits an allocation request to a controller, wherein said allocation request requests for determination of an SSID to be used;
an allocated SSID being an SSID to be used regarding said new flow is determined by said controller in response to said allocation request;
said flow control unit registers a correspondence relationship between said new flow and said allocated SSID on said flow SSID information; and
said flow control unit refers to said flow SSID information and uses said allocated SSID corresponding to said new flow to connect to an access point of said wireless LAN,
wherein said terminal further comprises:
a flow processing unit configured to retain a flow table indicating a correspondence relationship between each flow and port;
a management unit configured to retain a port management table indicating a correspondence relationship between each port and SSID; and
a wireless communication unit configured to perform communication with said access point,
wherein:
said flow SSID information is a combination of said flow table and said port management table;
when receiving a packet belonging to said new flow, said flow processing unit determines whether or not a flow entry regarding said new flow is registered on said flow table;

if the flow entry regarding said new flow is registered on said flow table, said flow processing unit outputs said packet to a designated port being a port designated by the registered flow entry and refers to said port management table to obtain said allocated SSID being an SSID corresponding to said designated port; and said wireless communication unit accesses said access point by using said allocated SSID and transmits said packet output from said designated port, wherein:

said terminal further comprises a controller communication unit configured to perform communication with said controller;

if the flow entry regarding said new flow is not registered on said flow table, said flow processing unit outputs said packet as said allocation request to said management unit;

said management unit transmits said allocation request to said controller through said controller communication unit and receives said allocation information from said controller through said controller communication unit;

said management unit refers to said port management table to recognize an allocated port being a port corresponding to said allocated SSID indicated by said allocation information;

said management unit instructs said flow processing unit to set a new flow entry indicating a correspondence relationship between said new flow and said allocated port in said flow table; and said flow processing unit registers said new flow entry on said flow table in accordance with the instruction from said management unit.

4. A network communication system comprising:
a communication device configured to access a communication network by using an access ID; and
a controller communicatively connected to said communication device, wherein:

said communication device retains flow access ID information indicating a correspondence relationship between each flow and access ID;

when initiating communication of a new flow, said communication device transmits an allocation request to said controller, wherein said allocation request requests for determination of an access ID to be used;

said controller determines, in response to said allocation request, an allocated access ID to be used regarding said new flow and notifies said communication device of allocation information indicating a correspondence relationship between said new flow and said allocated access ID;

said communication device registers, in accordance with said allocation information, the correspondence relationship between said new flow and said allocated access ID on said flow access ID information; and said communication device refers to said flow access ID information and uses said allocated access ID corresponding to said new flow to access said communication network; and a terminal comprising a controller communication unit configured to perform communication with said controller;

wherein:

if the flow entry regarding said new flow is not registered on a flow table, a flow processing unit outputs said packet as said allocation request to a management unit;

said management unit transmits said allocation request to said controller through said controller communication unit and receives said allocation information from said controller through said controller communication unit;

said management unit refers to said port management table to recognize an allocated port being a port corresponding to said allocated SSID indicated by said allocation information;

said management unit instructs said flow processing unit to set a new flow entry indicating a correspondence relationship between said new flow and said allocated port in said flow table; and said flow processing unit registers said new flow entry on said flow table in accordance with the instruction from said management unit.

5. The network communication system according to claim 4, wherein said access ID comprises an SSID required for connecting to an access point of a wireless LAN.

6. The network communication system according to claim 4, wherein said access ID comprises ID information of an internet service provider.

* * * * *